United States Patent [19]

Kracklauer

[11] 4,108,158

[45] Aug. 22, 1978

[54] SOLAR ENERGY POWERED HEAT GENERATOR

[75] Inventor: Aloysius C. Kracklauer, Conroe, Tex.

[73] Assignee: Sparkler Filters, Inc., Conroe, Tex.

[21] Appl. No.: 781,982

[22] Filed: Mar. 28, 1977

[51] Int. Cl.² ............................................. F24J 3/02
[52] U.S. Cl. ..................................... 126/271; 126/270
[58] Field of Search ............... 126/270, 271; 237/1 A

[56] References Cited

U.S. PATENT DOCUMENTS

| | | | |
|---|---|---|---|
| 761,596 | 5/1904 | Moss | 126/271 |
| 895,761 | 8/1908 | Huntoon | 126/271 |
| 1,424,932 | 8/1922 | Moreau | 126/271 |
| 1,575,309 | 3/1926 | Anderson | 126/271 |
| 2,311,579 | 2/1943 | Scott | 126/271 |
| 3,064,534 | 11/1962 | Tumavicus | 126/270 |
| 3,162,189 | 12/1964 | Small et al. | 126/270 |
| 3,929,121 | 12/1975 | Rogers | 126/271 |
| 4,030,477 | 6/1977 | Smith | 126/271 |

*Primary Examiner*—Kenneth W. Sprague
*Attorney, Agent, or Firm*—Arnold, White & Durkee

[57] ABSTRACT

A solar energy powered heat generator is especially designed for economical manufacture and maintenance by incorporating a plurality of triangular shaped mirrors interconnected into an inverted cone for collecting solar energy. A coiled length of tubing is disposed centrally of the cone for heat transfer. Preferably, a plurality of such cones with a respective plurality of such coils are interconnected to enable collection of solar energy as the sun orbits without using a sun tracking device.

3 Claims, 3 Drawing Figures

U.S. Patent  Aug. 22, 1978  4,108,158
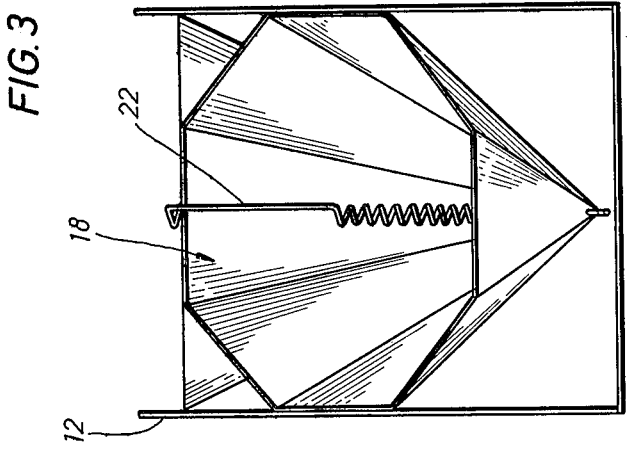
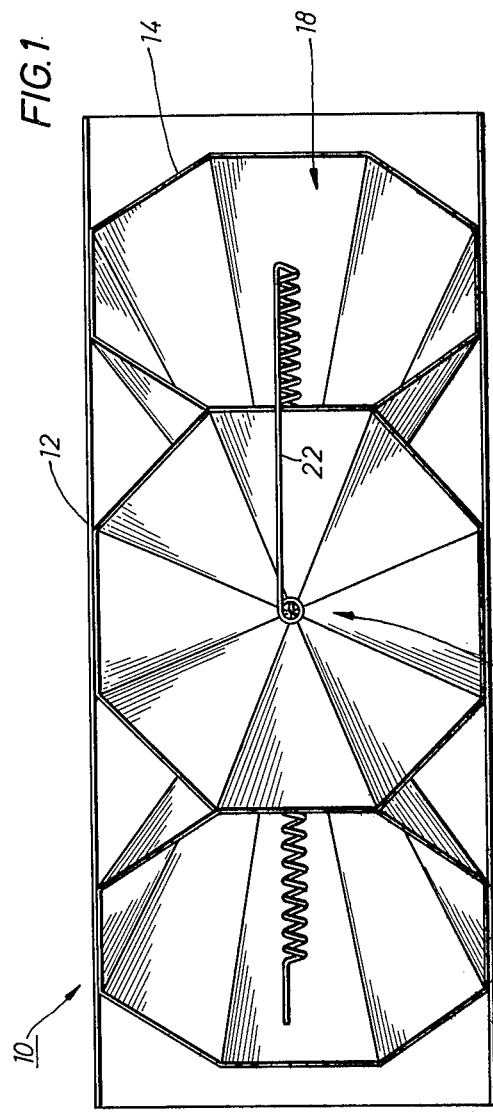
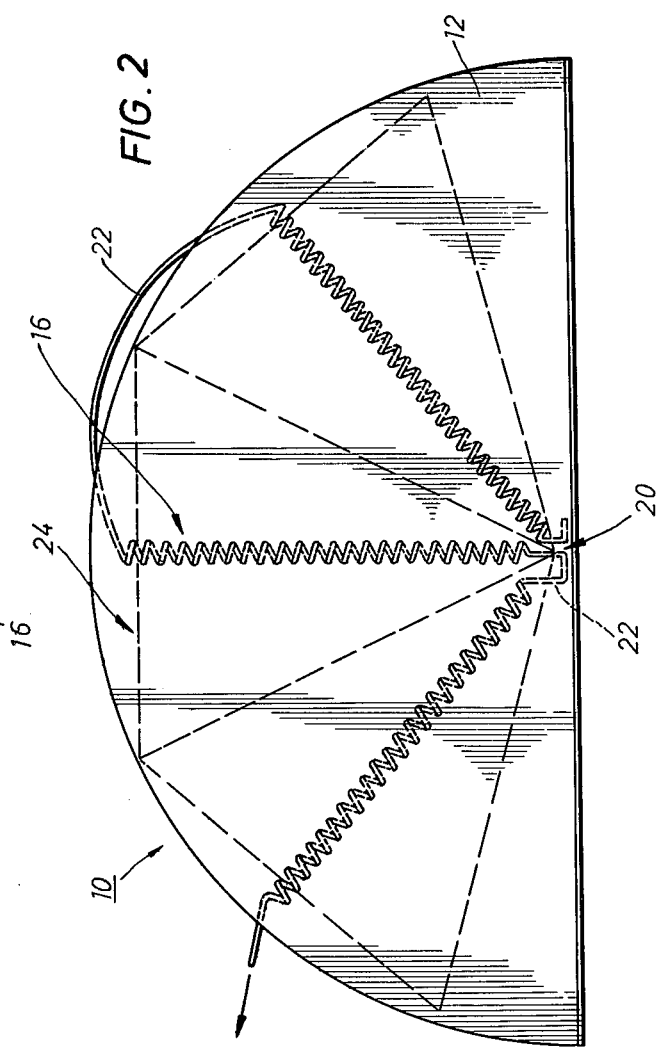

SOLAR ENERGY POWERED HEAT GENERATOR

BACKGROUND OF THE INVENTION

The present invention relates to solar energy powered heat generators in general, and more particularly to such generators having means for concentrating solar energy onto a heat exchange device, yet which are economical to produce and maintain.

As the world's resources for providing energy become more and more depleted, the need for developing energy utilizing non-depletable sources becomes more critical. Accordingly, there has been a renewed emphasis placed on developing systems powered by solar energy.

Previously proposed systems utilizing solar energy have not achieved full commercial success due to the relatively high cost of constructing and installing such systems. Such prior proposals have tended to require complicated and expensive sub-systems which focus incoming solar energy on to one form or another of a heat exchange device. Because of the complicated construction of such systems, manufacturing costs, and usually maintenance costs, were prohibitive, rendering the systems unsatisfactory for use by the average home owner.

Furthermore, prior art systems usually required sophisticated tracking devices for aiming energy collectors employed in such systems at the sun as it moved overhead during the day. Such tracking devices added to the overall expense of the system, further rendering it unsatisfactory to the average home owner.

SUMMARY OF THE INVENTION

The present invention provides a relatively inexpensive, yet efficient, heat generator for converting solar energy into heat. The heat generator is a design: (1) which is cheap to manufacture; (2) which requires little, if any, maintenance; and (3) eliminates the need for a sun tracking device. All in all, the design provides a solar energy powered heat generator which is suitable for use by the average home owner.

According to the invention, the solar energy powered heat generator includes a housing, a conical-shaped collecting structure supported within the housing and which has an open face directed for receiving solar energy; and an elongated heat transfer mechanism supported within the collecting structure and substantially along the central axis thereof. Preferably, the heat transfer structure is a length of coiled tubing comprising black coated copper and the conical shaped collecting structure is comprised of a plurality of triangular shaped, glass mirrors which are interconnected as a cone.

According to another aspect of the invention, the solar energy powered heat generator comprises a plurality of such conical-shaped collecting structures, each having its elongated heat transfer structure supported within the housing. The collecting structures are contiguously arranged in a fan shape about a substantially common point such that the open faces of the collecting structures span an arc somewhat less than 180°. This structure allows collection of the solar energy as the sun moves overhead, without necessitating a relative expensive sun tracking mechanism for aiming the collecting structures.

In the preferred embodiment, the elongated heat transfer structures of the multi-collecting-structure embodiment are serially connected, each such structure extending radially from the common point and substantially centrally within the cone of the collecting structure. In this embodiment, one pair of adjacent collecting structures has their heat transfer structures coupled through the common point while another pair of adjacent collecting structures has their heat transfer structures commonly coupled through their open faces.

It is thus a general object of the present invention to provide a new and improved solar energy powered heat generator utilizing a conical shaped collecting structure especially designed for high volume, low cost manufacture and a minimum of maintenance.

Other objects, features, and advantages of the present invention will become more apparent upon a reading of a detailed description of a preferred embodiment, in conjunction with accompanying drawings; wherein:

BRIEF DESCRIPTION OF THE DRAWINGS

FIG. 1 is a plan view of a solar energy powered heat generator according to one embodiment of the invention;

FIG. 2 is a front elevational view of the heat generator shown in FIG. 1; and

FIG. 3 is a side elevational view of the heat generator shown in FIG. 1.

DETAILED DESCRIPTION OF A PREFERRED EMBODIMENT

Referring now to FIGS. 1-3, a solar energy powered heat generator is constructed and arranged for collecting solar energy efficiently yet at an overall manufacturing and maintenance cost which is suitable for the average homeowner. The heat generator 10 includes a housing 12, a conical-shaped collecting structure 14 supported within the housing, and an elongated heat transfer structure 16. The collecting structure has a open face 18 which is directed for receiving solar energy. The enlongated heat transfer structure 16 is supported within the collecting structure substantially centrally along the axis extending from the point 20 of the cone to the open face 18.

Although not shown, it is understood that the heat transfer structure 16 is connected to any of various energy storage devices, such as reservoirs of fluid, stone, etc., or the heat generated could be transformed into electrical energy and stored in batteries, etc.

In the preferred and illustrated embodiment, the housing 12 is comprised of light weight steel and, as will subsequently be explained in detail, is semicircular configured for supporting a plurality of such collecting structures 14.

The collecting structure 14 is preferably comprised of triangular-shaped glass mirrors. Although other materials, such as highly polished metals may be suitable, the triangular glass mirrors are preferred for forming a faceted cone-shaped collecting structure 14 which is most economical to manufacture. That is, although a single sheet of rolled material to provide a nonfaceted cone may be suitable, it is believed that the faceted design is most economical. For the faceted collecting structure embodiment, the glass mirrors are preferably comprised of a high grade of iron free Corning glass. The glass panes may be interconnected either by suitable expoxy resins, or they may be entirely supported by the housing 12.

In the preferred embodiment, the heat transfer structure 16 is comprised of a coiled length of tubing 22. The tubing is preferably painted black for maximum absorption of the solar energy and is of a diameter of ½ inch to ¾ inch. As shown in FIG. 2, one end of the tubing 22 is passed through the point 20.

Although not shown, a small pump is provided which passes a heat transfer fluid, such as water, through the tubing 22. Because of the nature of the design, the coolant is circulated at a rather slow rate, on the order of one to two gallons per minute. This slow rate requirement allows usage of a pump with a minimum electrical current consumption, adding to the overall efficiency of the system.

Referring again to the drawings, the preferred heat generator 10 comprises a plurality of the collecting structures 14 disposed within the housing 12. The collecting structures 14 are contiguously secured in a fan-shape about the point 20 so that the open faces 18 span an angle of approximately 150°. Although the collecting structures 14 could be arranged so that the open faces 18 span a full 180°, such is unneeded for ample collection of the energy from the sun as it passes overhead.

As shown in FIGS. 1–3, the plurality of collecting structures 14 have their respective heat transfer structures 16, i.e., the segments of tubing 22, connected in series. As viewed in FIG. 2, the left hand pair of collecting structures 14 has the transfer structures 16 commonly connected at the point 20 while the right hand pair of structures 14 has their heat transfer structures 16 commonly connected through the respective open faces 18. The passage of the tubing 22 through the open faces 18 is not essential for operation of the invention, but does minimize the length of tubing required for the series connection.

Although not clearly shown in the drawings, an enclosure 24 is provided for the housing 12 for maintaining the ambient temperature within the collecting structures 14 as the ambient temperature increases due to unavoidable heat loss from the tubing 22. The enclosure 24 may suitably be attached to the housing 12 or to the collecting structures 14. The latter is preferred, wherein an opening is provided in the enclosure 24 for passage of the tubing 22. A thin layer of PYREX glass is suitable for the enclosure 24.

It is thus apparent that a solar energy powered heat generator has been described which is of a design that lends itself to inexpensive, mass production and relatively maintenance free operation. This provides a system which is attractive for the average home owner. The multi-collecting-structure embodiment provides the added advantage of eliminating the expense of a sun tracking device for aiming the collecting structure at the sun as it traverses the sky. It is understood, of course, that such a sun tracking device could be utilized if desired with either a singular or multiple-collecting-unit embodiment which does not span substantially the entire, effective solar energy collecting range.

Although a rather preferred embodiment has been described herein, it is understood that such description is by way of example only. Various modifications to the structure and arrangement of parts will be obvious to one of ordinary skill without departing from the spirit and scope of the invention as hereinafter claimed.

What is claimed is:

1. A solar energy powered heat generator comprising:
   (a) a housing;
   (b) a plurality of continuously disposed, conical shaped collecting structures supported within said housing, each of said collecting structures defined by a plurality of triangular-shaped glass mirrors interconnected in a single row in a configuration to provide a common junction of the respective corners of the mirrors and to provide an open face directed for receiving solar energy, the open face being defined by respective sides of the mirrors and the common junction being defined by the corners of the mirrors opposite the respective faces; and
   (c) a plurality of elongated heat transfer structures supported within the respecting collecting structures, said heat transfer structures including a plurality of serially connected, segments of coiled tubing extending radially from said common junction and substantially centrally within the respective collecting structure.

2. The heat generator according to claim 1 wherein:
   (a) said coiled tubing is black coated copper, and
   (b) said plurality of open faces span an arc of less than 180°.

3. The heat generator according to claim 2 and including a substantially solar energy transparent enclosure for covering the open faces.

* * * * *